United States Patent [19]
McDermott

[11] Patent Number: 5,179,254
[45] Date of Patent: Jan. 12, 1993

[54] DYNAMIC ADJUSTMENT OF FILTER WEIGHTS FOR DIGITAL TABLETS

[75] Inventor: Robert M. McDermott, Weston, Conn.

[73] Assignee: Summagraphics Corporation, Seymour, Conn.

[21] Appl. No.: 736,033

[22] Filed: Jul. 25, 1991

[51] Int. Cl.$^5$ .............................................. G08C 21/00
[52] U.S. Cl. ...................................... 178/18; 382/48; 382/41; 382/51
[58] Field of Search ............... 178/18, 19, 20; 382/41, 382/48, 50, 51, 29, 52

[56] References Cited

U.S. PATENT DOCUMENTS 3,521,235  7/1970  Becker .................................. 382/29
4,736,439  4/1988  May ..................................... 382/52

Primary Examiner—Stafford D. Schreyer
Attorney, Agent, or Firm—Rosen, Dainow & Jacobs

[57] ABSTRACT

A digitizer table which employs low pass filtering of raw coordinate data to reduce noise and jitter. A weighted filtering is employed, in which the new position data is averaged with a previous average or previous position data before being reported. The weighting factor applied to the new data is determined by the degree of monotonicity represented by the data, with intentional movements of the pointing device indicating high monotonicity undergoing light filtering but noise indicating low monotonicity undergoing heavy filtering.

10 Claims, 4 Drawing Sheets

DYNAMIC ADJUSTMENT OF FILTER WEIGHTS FOR DIGITAL TABLETS

The present invention relates to digitizers that process data for determining the values of signals representing the respective coordinates of the location of a pointing device in a coordinate system. More particularly, the present invention is directed to controlling the filtering of the generated raw data to reduce noise and jitter.

BACKGROUND OF INVENTION

Digitizers provide values in a given coordinate system that define the location of a pointing device on the digitizer tablet's surface. The operator typically manipulates the pointing device over the tablet's surface using a probe, for example, for tracing a pattern or design, or for creating a pattern or design. Typically, the tablet is connected to a host computer which displays on its monitor the traced or created pattern or design. The probe is commonly a stylus or a cursor that is either capacitively or inductively coupled to the tablet's surface. In many digitizers, the same controlling software and signal processing circuits are used for determining both X and Y coordinates of the pointing device position. In such digitizers, the signals coupled between the pointing device and the tablet's surface are sampled sequentially—say, first for the X coordinate, and then next for the Y coordinate—so that the respective signals for each of the coordinates are received and processed at different times by the digitizer. The signal processing occurs in real time, so that the user can observe displayed on his monitor the design or pattern while it is being traced or created.

Noise and jitter are common problems encountered in the use of digitizer tablets, especially near other electrical equipment creating electromagnetic interference. A common way to reduce the effects of noise is by filtering and signal averaging, which reduces the impact on the coordinate determination of aberrant signals due to noise and jitter.

Conventional jitter filters used in digitizer tablets are typically low pass filters implemented as a recursive filter:

$$x_n = \frac{kx_{n-1} + X_n}{k + 1}$$

where: $X_n$ is the new measured value, and $x_n$, $x_{n-1}$, are the filtered values. A recursive filter averages the new data with the previous average; thus, the sequence of old measured value data need not be stored, only the immediately prior $(n-1)$ filtered data.

With such a filter, a noise pulse is reduced by a factor of $1/(k+1)$ in the first coordinate report, $k/(k+1)^2$ in the second, etc.

For example, if we let $X_n = X_t + \epsilon$, where $X_t$ is the true signal and $\epsilon$ is noise, and $Q$ is defined as the noise-free component of the resultant coordinate, $$\text{then } x_n = \frac{k(x_{n-1}) + X_t + \epsilon}{k+1} = (Q_n) + \frac{\epsilon}{k+1}$$

$$x_{n+1} = \frac{k(Q_n + \epsilon) + X_t}{\frac{k+1}{k+1}} = (Q_{n+1}) + \frac{k\epsilon}{(k+1)^2}$$

-continued $$x_{n+2} = \frac{k(Q_{n+1} + k\epsilon) + X_t}{\frac{(k+1)^2}{k+1}} = (Q_{n+2}) + \frac{k^2\epsilon}{(k+1)^2}$$

This shows that the total "energy" of the Error is eventually dissipated through the filter, but over a number of reports, rather than as a simple spike.

In a relatively quiet electrical environment, a k factor of 1 or less is typically sufficient to filter noise from within the digitizer itself. With more complex equipment becoming prevalent, however, such as large high resolution video screens, noise pulses of very large magnitudes are not uncommon, particularly if the digitizer is located very close to such a monitor.

A possible solution is to increase k. However, there are problems with a large k recursive filter:

$$\left(x_n = \frac{kx_{n-1} + X_n}{k+1}\right)$$

Just as the noise pulse is spread over a number of reports, so are intentional movements of the pointing device. An intentional movement of M gets reported as $M/(k+1)$, then $kM/(k+1)^2$, ... Stated more formally, $$X_n = M \sum_{i=1}^{n} \frac{k^i}{(k+1)^{i+1}}$$

Theoretically, there is always a lag, which becomes smaller and smaller with each new report.

With a large k, two effects are very noticeable: initial movements are truncated (first report is only $M/(1+k)$, and final movements are elongated (subsequent $(k^n/(1+k)^n)$ reports arrive after you've stopped.) In other words, reported actions lag behind the real actions, and, with inconsistent movement (such as printing or sketching) the lag causes sharp changes to be blurred, as the subsequent reports of opposing movements cancel themselves. An E traced as shown at 10 in FIG. 1A becomes distorted and appears as shown at 11 in FIG. 1B on the monitor display.

There are also odd secondary effects and implementation effects. Movement is associated with switch status—e.g. movement with a switch closed is interpreted differently by the application than movement with the switch open. The subsequent reports, after the $M/(1+k)$ report, after the switch is released, have questionable switch status—you want to make sure the movement that had occurred gets reported with the switch closed, but that subsequent movement gets reported with the switch open. But, subsequent reports contain both movements, and you can't do both, so typically the subsequent reports contain a switch open status and the tail end of characters are truncated. For example, an E traced as shown at 12 in FIG. 2A appears on the display as shown at 13 in FIG. 2B.

From an implementation viewpoint, integer arithmetic is typically employed for maximum speed, resulting in truncation errors. These truncation errors can produce inaccuracies: i.e., in the series terms $k^i/(1+k)^{i+1}$, once the truncation brings it to 0, all subsequent terms are lost. In the simplest case, a movement $m < (1+k)$ is completely truncated, such that approaching a point from the left can result in a difference of 2k from the same point approached from the right. [The units of the 2k error are the raw resolution of the tablet; the inaccuracy can be reduced by scaling the resolution, but this is at the expense of the number of bits required to store $x_n$ and $x_{n-1}$].

The goal is to be able to heavily filter the noise pulses, but minimally filter intentional movement.

One approach is to modify the filter constant as a function of the magnitude of the change$\Delta$—e.g., small changes are heavily filtered and large changes are lightly filtered. This can be implemented as either a discrete or continuous function:

| | Discrete | Continuous |
|---|---|---|
| $k =$ | $\begin{cases} k_{heavy} \text{ if } \Delta < \text{limit} \\ k_{light} \text{ if } \Delta \geq \text{limit} \end{cases}$ | $k = k/|\Delta|^j$ |

The problem with this approach, however, is that it requires that the amplitude of the change be used as a distinguishing criteria between noise and intentional movement. For a small k, this is probably a non-impact requirement, but in a high noise/high k environment, it has serious impact on small intentional movements, and/or, on large noise impulses.

If the noise is larger than the limit, it is only lightly filtered—thus the limit should be set high; but, the higher the limit, the more noticeable becomes the effect on intentional movements. If the limit is set low enough to allow for lightly filtered intentional movements, large noise pulses will produce spikes.

The problem is that the measure used to reduce filtering, amplitude change level, is the very parameter we want to apply the filtering to.

SUMMARY OF INVENTION

The approach of the invention is to use an independent measure to determine how to modify the filter constant. Rather than use amplitude to determine whether the change was intentional or not, monotonicity of the signal is used as a better indicator. Intentional movement, compared to random noise, is characterized as a relatively low frequency phenomenon (hence the use of a low pass filter in conventional tablets). An alternative view of low frequency is a low rate of direction change. Random noise can be expected to produce positive as well as negative effects, in no particular order, while intentional movement at the typical tablet scan rate (100–200 reports/sec.) should produce a series of reports in the same direction—i.e., an intentional movement can be expected to be more monotonic than noise.

As in the case of amplitude dependent dynamic filtering, the filtering of the present invention can also be implemented as discrete or continuous:

| | Discrete | Continuous |
|---|---|---|
| $k =$ | $\begin{cases} k_{heavy} \text{ if } M > M_{limit} \\ k_{light} \text{ if } M \leq M_{limit} \end{cases}$ | or $k = k/|M|^j$ |

BRIEF DESCRIPTION OF THE DRAWINGS

The features and advantages of the present invention may be better understood when the detailed description of the preferred embodiments provided below is considered in conjunction with the accompanying drawings wherein.

DETAILED DESCRIPTION OF PREFERRED EMBODIMENTS

Figure 1A:
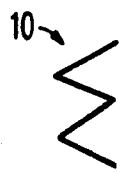
FIG. 1B shows the effect of lag on the displayed pattern when tracing the character shown in FOG. 1A.
Figure 1B:
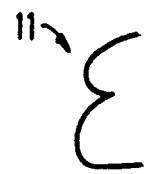
Figure 2A:
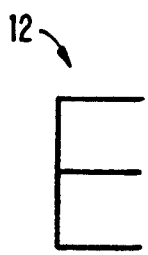
FIG. 2B shows the effect of switch status on the displayed pattern when tracing the character shown in FIG. 2A.
Figure 2B:

Monotonicity can be measured by the consistency of the direction of movement. If the transducer is intentionally moved to the right, for example, one would expect to see continuously increasing X measures; noise, on the other hand, would be expected to rarely produce a series of increasing values. Therefore, monotonicity is defined as the number of consecutive reports in the same direction. If the direction changes, one could conclude that either the probe stopped moving in that direction, or that noise is present. In either event, invoking a heavy filter would be appropriate, whereas while the direction was consistent, less of a filter would be appropriate. Pseudocode for a simple algorithm to implement this follows below, with the symbols having the following meanings M represents the monotonicity of movement in a particular direction along a coordinate axis, with its value being 0 if there is no movement or change of direction, which is incremented or decremented if movement is in the same direction as earlier; $\Delta$ is the difference between the new and previous probe positions along a particular coordinate axis; K is the maximum filter weight to which the raw data signal is subject; and k is the new filter weight:

$\Delta = X_n - x_{n-1}$
If $\Delta = 0$ then M = 0
If $\Delta > 0$ then
    If M $\geq$ 0 then M = M + 1 else M = 0
If $\Delta < 0$ then
    If M $\leq$ 0 then M = M - 1 else M = 0
If M <> 0 then k = K/M² else k = K(which is one possible function)
$x_n = (kx_{n-1} + X_n) / (k + 1)$.

With this algorithm, the initial (1/(1+K)) lag will still there, but the trailing lag will be minimal—minimizing the switch status problem after release. The blurred edge problem will be reduced as the trail end would have been at the corner and not have residual opposing movement And, this approach will not have the truncation limit problem, as the remainder $\Delta$ will cause the magnitude of M to continually increase until, with decreasing filtering, $\Delta$ goes to b 0 ($X_n$ then matches $x_n$ exactly).

Summarizing, the digitizer tablet of the invention provides dynamic adjustment of filter weights to heavily filter noise and to minimally filter intentional user movements of the pointing device, and it uses signal monotonicity (same direction changes) to distinguish intentional user movements from the noise.

A preferred way to implement this is in software using a desired filter function. In the example given above, using a recursive filter, the filtered value $X_n$ to be reported is a function of the previous filtered value and the new measured value, modified by a value k which varies with the square of the degree of monotonicity of the signal. So long as monotonicity is preserved, meaning the signal direction remains unchanged, k remains small and so the new measured value is only lightly filtered. If the signal direction changes, meaning monotonicity ceases, k is reset to the maximum value so the new measured value is more heavily filtered. The signal averaging with the previous filtered values tends to smooth out the reported values.

Figure 3:
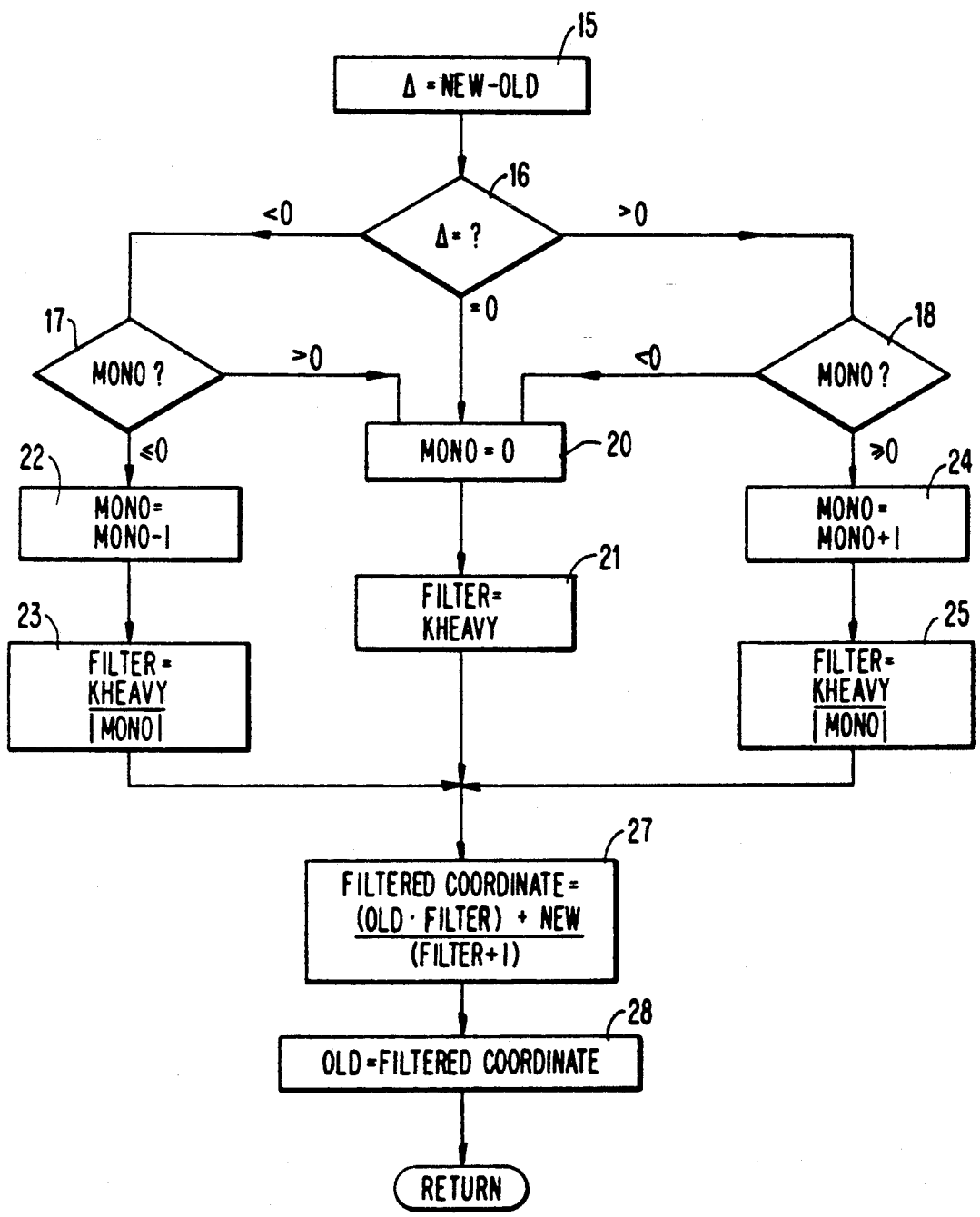
FIG. 3 is a flow chart of one form of software implementation of dynamic filtering in accordance with the invention.

FIG. 3 is a flow chart of a preferred algorithm for a monotonicity filter for increasing the resistance to noise of a digitizer tablet in accordance with the invention. In this flow chart, OLD=the prior filtered coordinate value; NEW=the latest measured coordinate value, with the OLD value (updated by the new value) returned and reported; MONO is a monotonicity counter. This flowchart shows the use of another monotonicity weighting equation, which reduces the filtering by $1/|M|$, rather than the $1/M^2$ discussed above.

In block 15, the OLD filtered value is subtracted from the NEW measured value and assigned to $\Delta$. The value of $\Delta$ is tested against 0 at block 16, and proceeds down if $\Delta=0$. The left branch represents movement in a decreasing coordinate direction (e.g. to the left or down in a conventional cartesian coordinate system); the right branch represents movement in an increasing coordinate direction. In blocks 17 or 18, this movement direction is tested to see if it's in the same direction as the prior movement (the "MONO" variable is similarly defined to be negative for decreasing coordinate direction, positive for increasing coordinate direction). If the prior direction (the sign of MONO) is different than the current movement (the sign of $\Delta$) in blocks 17 or 18, control passes to block 20, where the MONO variable is reset to 0. Control also passes to block 20 if the test of delta in block 16 showed no movement. From block 20, after resetting the MONO counter to 0, the filter factor is reset to the maximum filter weight (KHEAVY).

If the current direction is negative (left from block 16), and the prior direction is negative or 0 (down from block 17), the monotonicity counter, MONO, is decremented, showing an increasingly consistent movement in the negative direction. If the current direction is positive or 0 (right from block 16), and the prior direction is positive or 0 (down from block 18), the monotonicity counter, MONO, is incremented, signifying an increasingly consistent movement in the positive direction. Blocks 23 and 25 area identical, and perform the desired filter weighting based on the current monotonicity factor; in this example, they reduce the filtering by the absolute value of the monotonicity counter.

The new filter value, determined at boxes 21, 23, or 25, is then used in the selected filter for the product, in this example, a conventional recursive low pass filter shown in box 27. The new filtered coordinate is subsequently saved, in box 28, as the "old" filtered coordinate in preparation for the next cycle's reentry at box 15.

This filter would be implemented for both X and Y (and other dimensions if available), and each would maintain their particular monotonicity counter in the preferred implementation, although a single monotonicity measure could be devised which incorporates both (or all) dimensions; e.g. instead of merely positive and negative classifications of movement, one could define four classes: (1) up and to the right, (2) up and to the left, (3) down and to the right, and (4) down and to the left, and have a monotonicity measure which increased as each new movement remained in that class and reset as it changed classes. One could further extend the approach to include a measure of the angle of movement, and base the monotonicity measure on the consistency of the angle. A feature of this invention is the use of a measure which is independent as much as possible from the amplitude of the change, and is indicative of the consistency of the change, as consistency of change is, empirically, a better discrimination between noise and intentional movement.

Figure 4:
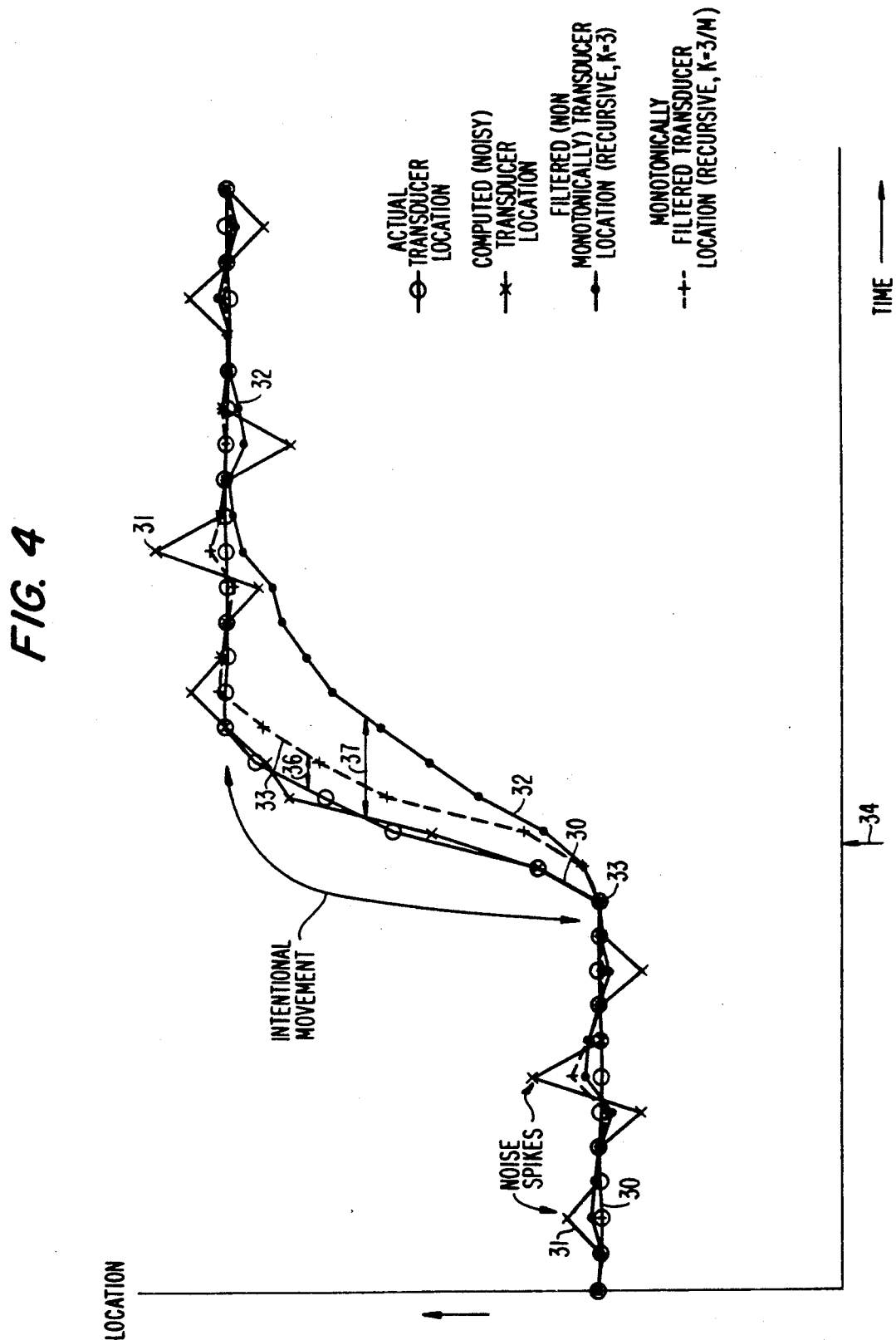
FIGS. 4 and 5 are graphs plotting display cursor position for various pointing device movements under different operating conditions with and without use of the invention.
Figure 5:
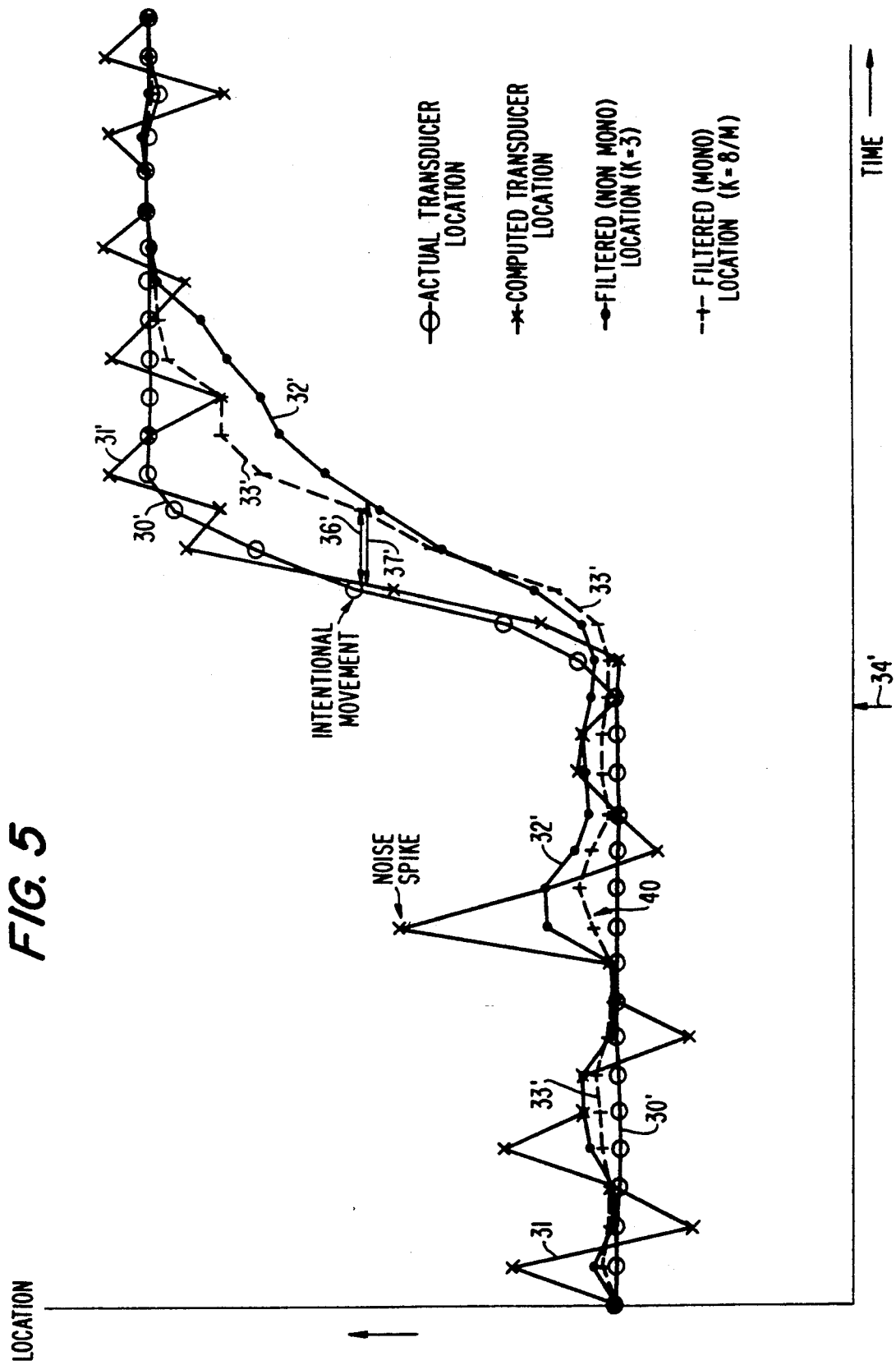

FIGS. 4 and 5 are graphs illustrating the benefits of the dynamic filter adjustment of the invention. FIG. 4 shows the improved time response using a modest filter constant (k=3), while FIG. 5 demonstrates the improved noise immunity using a heavier filter constant (k=8). Both graphs show pointing device movement from left to right across the tablet, with the circle-points representing the actual pointing device location, the Xs the prefiltered, computed locations, the dots the filtered values with a recursive filter having a constant value k=3, and the dash points the values computed using the dynamic filter adjustment of the invention with k=3/M (FIG. 4) and k=8/M (FIG. 5). the curve tracing the actual probe movements is reference 30; the prefiltered curve 31; the non-dynamic filtered curve shown solid 32; and the dynamic filtered curve using the invention shown in dashed lines at 33.

As will be observed, at the time indicated by the arrow 34, the pointing device suddenly moves upward. The lag effect between the dynamically filtered location value (indicated at 36) due to the heavily-filtered monotonicity filter is much smaller than that 37 of the lightly-filtered non-monotonicity filter. FIG. 4 also shows the presence of noise spikes randomly occurring (line 31's difference from line 30) and their effect on the reported values.

FIG. 5 uses similar primed reference numerals to designate corresponding elements. In this case, the filter coefficient k has been increased to 8/M for the monotonicity filtered computed points, where M has the same meaning as MONO in FIG. 3. In this case, the larger k greatly reduces the effect of the large noise spike with the invention (shown at 40) in comparison with the corresponding solid lie curve part 32', which is the response which would have been generated by a lightly weighted conventional filter. This is due to the additional heavy filtering allowed on sudden changes in $\Delta$. Yet, the heavy filtering has not produced a corresponding penalty in lag. Note the lag comparisons shown at 36' (the heavy filtered MONO response) and 37' (the lightly filtered conventional filter), which are roughly equal.

The invention is not limited to the specific algorithms so far described for dynamically adjusting the filter weight. Other ways of measuring monotonicity so as to distinguish the latter from random noise are deemed within the scope of the present invention. Moreover, other functions which modify the filter weight to a degree greater than the square of the monotonicity or smaller than the first power of the monotonicity ar also considered well within the scope of the present invention.

Moreover, while the preferred way of implementing the invention is under software control, there are other ways involving hardware that can also be used and are deemed within the scope of the invention. For example, the weighting factor k can be implemented in hardware as a series of discrete factors, for example, $k_1$, $k_2$, $k_3$, $k_4$ of increasing value, with the software selecting which of the factors is to be applied to the new or latest coordinate value depending upon the degree of monotonicity measured.

Moreover, while the use of a recursive filter is preferred, the invention can also be employed with a non-recursive filter which averages the new coordinate raw data value with the previous unfiltered coordinate raw data values.

As will be evident from the foregoing discussion, the invention is applicable to the kind of digitizer tablet exemplified by the Kamm et al U.S. Pat. No. 3,904,822; and the Davis U.S. Pat. No. 4,368,352; wherein the grid conductors are scanned and driven in some predetermined sequence and a modulated R.F. signal derived from the pointing device, or the pointing device driven and the modulated R.F. signal derived from the scanned grid conductors, the derived signal processed and filtered to produce a demodulation envelope whose zero-crossing or other reference point is detected and used to stop a counter activated at the beginning of the scanning process, the recorded count being an indication of the position of the center of the pointing device over the grid, the contents of which patents are herein incorporated by reference.

It will also be understood that, while specifically described in connection with processing of the X-axis coordinate value, the dynamic filter adjustment of the invention is obviously applicable with respect to processing of the Y-axis coordinate value.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modification are intended to be included within the scope of the appended claims.

What is claimed is:

1. In a digitizer tablet, a method for determining and reporting pointing device position over the digitizer tablet, comprising the steps:
    (a) determining a value representing a position of the pointing device along a coordinate axis of the tablet,
    (b) determining the direction of the current movement of the pointing device,
    (c) measuring the consistency of the current movement of the pointing device compared to previous movements,
    (d) modifying the said value determined in step (a) based on the measured consistency of step (c),
    (e) reporting the modified value determined in step (d) as a position along the coordinate axis of the pointing device.

2. The method of claim 1, wherein the measurement of step (c) includes quantifying the consistency based on at least two consecutive previous pointing device positions.

3. The method of claim 1, wherein the value in step (a) is based upon weighted averaging of a previous position value with a current position value, and in step (d) the latter is heavily weighted when the measured consistency is low and lightly weighted when the measured consistency is high.

4. In a digitizer tablet, a method for determining and reporting pointing device position over the digitizer tablet, comprising the steps:
    (a) determining a value representing a position of the pointing device along a coordinate axis of the tablet,
    (b) determining the direction of the current movement of the pointing device,
    (c) measuring the consistency of the current movement of the pointing device compared to previous movements,
    (d) modifying the said value determined in step (a) based on the measured consistency of step (c),
    (e) reporting the modified value determined in step (d) as a position along the coordinate axis of the pointing device.

5. The method of claim 4, wherein the measurement of step (c) includes quantifying the consistency based on at least two consecutive previous pointing device positions.

6. The method of claim 5, wherein the value in step (a) is based upon weighted averaging of a previous position value with a current position value, and in step (d) the latter is heavily weighted when the measured consistency is low and lightly weighted when the measured consistency is high.

7. The method of claim 4, wherein the first value used in the averaging of step (d) is a low pass filtered value representing a previous averaging of values.

8. The method of claim 6, wherein step (c) is carried out by storing an increase in the monotonicity degree when the new position of the pointing device represents movement in the same direction when going from an earlier previous position of the pointing device to a later previous position.

9. The method of claim 8, wherein the weighting factor is a function of the first or second power of the degree of monotonicity.

10. The method of claim 8, wherein the weighting factor is a function of a power of the degree of monotonicity.

* * * * *